United States Patent [19]

Brogårdh et al.

[11] Patent Number: 4,581,528
[45] Date of Patent: Apr. 8, 1986

[54] FIBER OPTICAL MEASURING DEVICE FOR MEASURING DYNAMIC MOVEMENTS

[75] Inventors: Torgny Brogårdh; Bertil Hök; Christer Ovren, all of VästerÅs, Sweden

[73] Assignee: Asea Aktiebolag, VästerÅs, Sweden

[21] Appl. No.: 498,478

[22] Filed: May 26, 1983

[30] Foreign Application Priority Data

May 27, 1982 [SE] Sweden ................................ 8203296

[51] Int. Cl.⁴ .................................................. H01J 5/16
[52] U.S. Cl. ........................................ 250/227; 73/655;
250/231 P; 350/96.13
[58] Field of Search .............. 250/227, 231 R, 231 P, 250/205; 350/96.15, 96.13; 356/73.1; 73/655, 657

[56] References Cited
U.S. PATENT DOCUMENTS

| | | | |
|---|---|---|---|
| 4,083,254 | 4/1978 | Nissl | 73/517 R |
| 4,281,245 | 7/1981 | Brogardh et al. | 250/227 |
| 4,356,448 | 10/1982 | Brogardh et al. | 250/231 R X |
| 4,376,890 | 3/1983 | Engotröm et al. | 250/227 |
| 4,451,730 | 5/1984 | Brogardh et al. | 250/227 |
| 4,473,747 | 9/1984 | Brogardh et al. | 250/231 P |
| 4,493,995 | 1/1985 | Adolfson et al. | 250/227 |

*Primary Examiner*—John K. Corbin
*Assistant Examiner*—R. Eyssallenne
*Attorney, Agent, or Firm*—Watson, Cole, Grindle & Watson

[57] ABSTRACT

A fiber optical measuring device for measuring dynamic movements between a boundary surface of an optical fiber and a boundary surface of a movement-sensing body. The optical fiber is adapted to transmit optical energy to and from the boundary surfaces and at least one of the boundary surfaces includes a photoluminescent material, the optical energy reflected from the boundary surface of the body being dependent on the relative position between the two boundary surfaces.

17 Claims, 3 Drawing Figures

FIBER OPTICAL MEASURING DEVICE FOR MEASURING DYNAMIC MOVEMENTS

TECHNICAL FIELD

The present invention relates to a fiber optical measuring device or sensor for sensing dynamic movements between at least two boundary surfaces, where one boundary surface consists of the end surface of an optical fiber and another end surface consists of the surface of a motion-sensitive movable body, the optical fiber being arranged to transmit optical energy to and from the boundary surfaces of the fiber and the movable body.

DISCUSSION OF PRIOR ART

Fiber optical sensors for measuring dynamic movements in systems employing one single fiber have required accurate fitting of complicated fine mechanical elements and have had a limited dynamic range when utilizing luminescence.

Fiber optical sensors of the above-mentioned kind for measuring movements are previously known, among other things, from U.S. Pat. Nos. 4,249,076, 4,275,296 and 4,345,482 and published Swedish Patent Application Nos. 7902320-7, 7910715-7 and 8105954-5. At least one of the following problems may exist in connection with some of these known measuring devices:

1. The sensor requires two or more fibers for energising and signal feedback.
2. The sensor does not permit fiber optical contact devices because of varying reflections at the boundary surfaces between the fiber material and air.
3. The sensor comprises a plurality of mechanical components, which have to be fitted together with great precision during installation.
4. The dynamic range of the sensor is limited (i.e. it exhibits a low signal/noise ratio).

OBJECTS OF THE INVENTION

One object of the present invention is to provide a solution to the above-mentioned problems and other problems associated therewith.

A further object of the invention is to provide an improved motion sensor which is easy to produce by known photolithographic/etching techniques.

A still further object is to provide a measuring system which is substantially insensitive to optical losses in the fiber system.

SUMMARY OF THE INVENTION

The invention is characterized in that at least one of a pair of boundary surfaces between which relative movement arises on motion sensing defines at least one layer of photo-luminescent material. The measuring device is so arranged that the optical energy, reflected from one of the boundary surfaces, becomes dependent on the relative position between the boundary surfaces. The motion sensing can be via a body firmly connected to the fiber and comprising an elastic portion, permitting the required relative movements between the boundary surfaces. Thus, by utilizing reflected optical energy from a movable body as well as photo-luminescence in combination with the elastic portion, one and the same fiber can be utilized for both optical feed and optical signal feedback. The utilization of the reflex signal makes possible a high signal-to-noise ratio while at the same time the photo-luminescence signal can be utilized to compensate for varying light attenuation in the transmission path without obtaining a dependence on varying reflexes in the boundary surfaces, for example at fiber joints. It is possible to employ well tried semiconductor technology when producing the movable motionsensing body, which permits high precision at a low cost.

By attaching the elastic portion and the end surface to the fiber end, a combined body is obtained, which is simple and practical to design.

BRIEF DESCRIPTION OF DRAWING

The invention will now be described in greater detail, by way of example, with reference to the accompanying drawing, in which.

DESCRIPTION OF PREFERRED EMBODIMENTS

Figure 1:
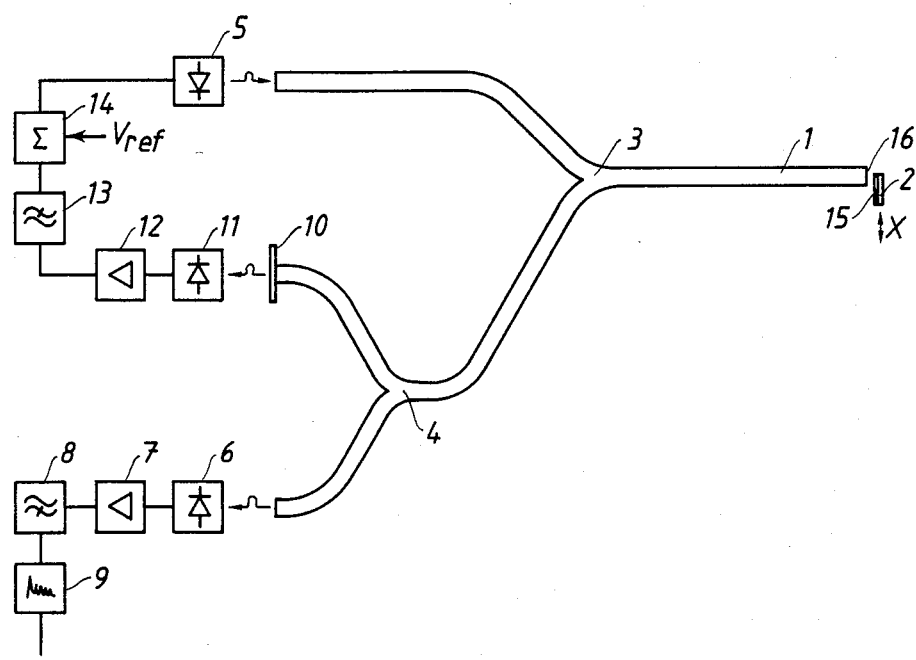
FIG. 1 shows schematically the layout of a measuring system according to the invention.

FIG. 1 shows, in principle, the mode of operation of one measuring system according to the invention.

A light emitting diode (LED) 5 feeds optical energy (exciting radiation) into one end of a fiber 1 via a fiber branch 3. A proportion of the exciting radiation leaves the downstream end surface 16 and a proportion is reflected back down the fiber 1 by the end surface 16. A sensor 2, capable of moving in the directions X is disposed adjacent to the surface 16 and includes a boundary surface 15 which confronts the surface 16 to a greater or lesser degree depending on the movement effected in the directions X. Some exciting radiation reaching the surface 15 is reflected therefrom, but some passes into the sensor to generate photo-luminescence, the resulting photo-luminescent radiation also being transmitted towards the end surface 16 of the fiber 1 and entering the latter. Thus, travelling back along the fiber 1 will be reflected exciting radiation and luminescent radiation, the proportion between these being a measure of the position of the sensor 2 and thus changes in the proportion indicating movement of the sensor.

The optical energy reflected back down the fiber 1 is divided into two electrical measuring channels (6-9 and 11-13) after passage through the branch 3 and one further branch 4 and at least one optical filter 10. This filter is designed so that the reflected exciting radiation is separated from the luminescent radiation. This can be achieved by edge filters or bandpass filters, utilizing, for example, interference in thin layers. In many cases, the measuring channel (6-9) for reflected exciting radiation does not need any optical filter since the photo-luminescence contribution typically only constitutes about one-thousandth of the total optical energy.

In both measuring channels, the optical signals are converted into electric signals by means of photodiodes 6, 11 and these signals are amplified to a suitable voltage range in respective amplifiers 7, 12. The reflex signal 6-9 includes a high-pass filter 8, which is used to eliminate the effect of static reflections in the optical system, for example at the branches 3, 4 and at fiber joints. At the same time this arrangement means that the system will not respond to very slow changes in position between the boundary surfaces 15 and 16. The high-pass filtered signal in the reflex channel is further supplied to a registering unit 9 for further signal processing and/or documentation, i.e., generating a quotient between the signal components derived from reflected and photo-luminescent energy. With the LED 5 and a control circuit 13, 14, the second (or photoluminescence) channel forms a closed loop with feedback, in which the intensity of the exciting radiation is controlled, in accordance with known technique, to provide a constant photo-luminescent signal. Since both reflections and photo-luminescence from the boundary surfaces 15, 16 are linearly related to incident energy, and the signal paths for both are identical, a very good compensation is obtained in this way for varying light losses along the optical signal path.

An alternative method, which is comparable with respect to performance, is to maintain the intensity of exciting radiation constant, combined with electrical propagation of the signals from the two measuring channels.

To eliminate problems with dark current in the photodiodes or the effect of extraneous light, it may be desirable to provide a pulsed drift of the LED 5 in combination with the use of phase-locked amplifiers at 7 and 12.

Figure 2:
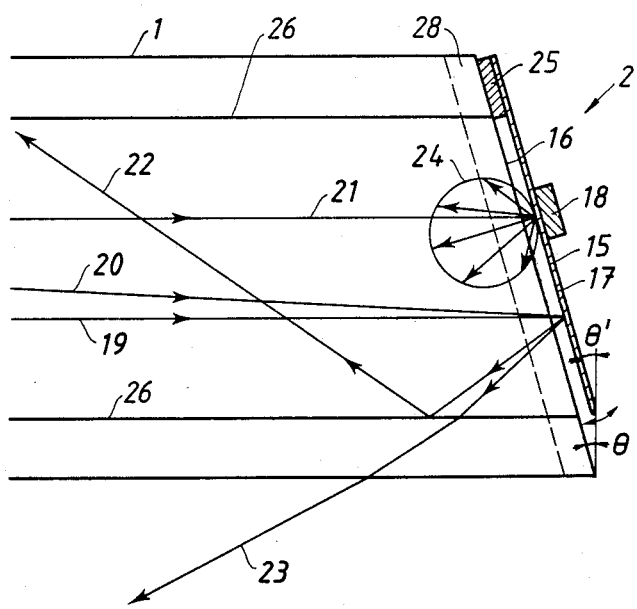
FIG. 2 shows, in more detail, one embodiment of a movement-sensing portion of the sensor used in the system of FIG. 1.

FIG. 2 shows a practical embodiment of sensor 2 and shows the end region of the fiber 1 of FIG. 1 more realistically. The specific embodiment shown in FIG. 2 is an accelerometer, in which a body 25 is fixedly attached to the fiber end surface 16 and supports a resilient portion 17 carrying a seismic mass 18. Upon the appearance of an applied acceleration, the mass 18 produces a deflection of the resilient portion 17.

The surface 15 of the resilient portion 17 will thus vary in parallelism with the end surface 16 of the fiber 1, as the sensor 2 is subjected to acceleration or deceleration. The mass 18 is preferably concentrated over a small part of the portion 17, and by locating this concentrated mass 18 closer to or farther from the body 25 (the point of attachment of the resilient portion 17 to the fiber 1), a different mechanical sensitivity in the measuring device is obtained. Since the boundary surfaces 15, 16—in the rest position—make an angle $\theta°$ (which is not 90°), with the elongated direction of the fiber 1, certain rays (20, 23) are lost from the fiber system after reflection from the boundary surface 15, whereas other rays (19, 22), due to total internal reflection at the refractive index discontinuity 26 between the core and sheath of the fiber 1, are passed back into the fiber system. The angle $\theta$ can be adjusted so that approximately half of the reflected radiation is retained in the fiber and half is lost. This proportion (reflected rays lost to reflected rays retained) is very sensitive to changes of the angle $\theta'$, caused by relative movements between the surface 15 and the surface 16. The resilient portion 17 of the sensor 2 contains a photo-luminescent material which emits luminescence of a longer wavelength than that of the incident exciting radiation. The directional dependence of the luminescence is illustrated in FIG. 2 by the incoming ray 21 and the outgoing bundle of rays 24, the distribution of which obeys Lambert's law, and thus has a relatively weak directional dependence.

It will be appreciated therefore that the intensity of reflected radiation becomes dependent on the quantity to be measured (in this particular case, acceleration), whereas the intensity of luminescent radiation is largely independent thereof. The sensor 2 in the example illustrated in FIG. 2 is formed as epitaxial layers of a semiconductor material, for example $Al_xGa_{l-x}As$, where $x=0$ in certan layers and $x=0.3$-$0.5$ in other layers. The semiconductor material could also be $In_xGa_{l-x}As_yP_{l-y}$. By variations of the Al content, the energy gap of the material and thereby its luminescence properties and its resistance to chemical attack are affected. It is thus possible to produce, by known chemical etching and photolithographic pattern techniques, three-dimensional formed bodies with elastic and optical properties as stated above.

Thus the sensor 2 shown in FIG. 2 can be simply produced by making a three layer sandwich of a material destined to form the body 25, a material destined to form the resilient portion 17 and a material destined to form the seismic mass 18, and preferentially etching away the unwanted regions of the materials forming 25 and 18 to leave the configuration shown in FIG. 2.

Figure 3:
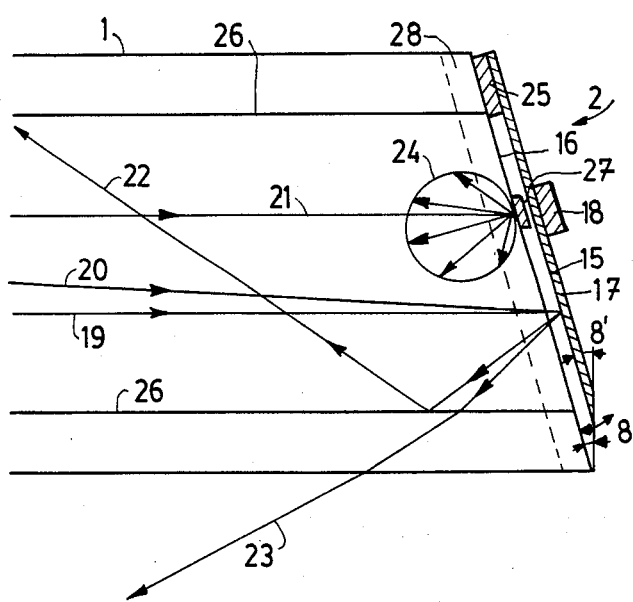
FIG. 3 shows a second embodiment of a movement-sensing portion of the sensor used in the system of FIG. 1.

Since the photo-luminescent light returned back along the fiber 1 is not required to change with changes in the sensed quantity to be measured, the photoluminescence could, as shown in the embodiment of FIG. 3, be generated in the fiber 1 on or close to the surface 16 (by applying a coating of luminescent material 27 onto the surface 16. Of course, the photoluminescent material could alternatively be incorporated in an end region 28 of the fiber 1. The photoluminescent material may consist of metal ions.

What is claimed is:

1. In a fiber optical measuring device for sensing dynamic movements between two boundary surfaces where a first of said two boundary surfaces constitutes an end surface of an elongated optical fiber and a second of said boundary surfaces constitutes the surface of a movement-sensing body, said optical fiber being adapted to transmit optical energy to and from said first and second boundary surfaces, the improvement wherein at least one of said first and second boundary surfaces is constituted by a photo-luminescent material, wherein said first and second boundary surfaces are so arranged that the optical energy reflected from said second boundary surface becomes dependent on the relative position between said boundary surfaces, wherein said movement-sensing body is secured to said optical fiber and comprises a resilient portion permitting relative movements between said two boundary surfaces, and wherein at least one of said boundary surfaces extends at angle with the elongated direction of said optical fiber which is different from 90°.

2. A fiber optical measuring device according to claim 1, wherein said movementsensing body comprises a seismic mass mounted on said resilient portion.

3. A fiber optical measuring device according to claim 1, wherein said movementsensing body is constructed from a semiconductor material chosen from the group consisting of $Al_xGa_{l-x}As$ and $In_xGa_{l-x}As_yP_{l-y}$.

4. A fiber optical measuring device according to claim 3, wherein the semiconductor material constitutes epitaxial layers.

5. A fiber optical measuring device according to claim 1, wherein the end surface of said optical fiber is coated with a photo-luminescent material.

6. A fiber optical measuring device according to claim 1, wherein the optical fiber includes a photo-luminescent material near its end surface.

7. A fiber optical measuring device according to claim 1, wherein the photo-luminescent material consists of metal ions.

8. A fiber optical measuring system including a measuring device according to claim 1, in which the measuring device is so arranged that the relative position between said optical fiber and said movementsensing body determines the transmission of optical energy from the boundary surfaces which is derived from photo-luminescence, back into said optical fiber.

9. A fiber optical measuring system according to claim 8, including a means for dividing the optical energy reflected into the fiber into a component which is substantially derived from said reflected optical energy and a component which is substantially derived from said photo-luminescent energy.

10. A fiber optical measuring system according to claim 9, including an electronic filter through which the signal transformed from reflected optical energy into electrical energy passes.

11. A fiber optical measuring system according to claim 9, including a control circuit to which an electrical signal derived from the photo-luminescent component is fed for control of exciting optical energy fed into said optical fiber.

12. A fiber optical measuring system according to claim 9, including an electronic circuit for generating a quotient between the signal components derived from reflected and photo-luminescent energy, respectively, after transformation into electrical signals.

13. A fiber optical measuring system including a measuring device according to claim 1, in which the measuring device is so arranged that the relative position between said optical fiber and said movementsensing body affects the transmission of the reflected and the photo-luminescent energy back into said optical fiber, whereby the influence of the energy due to luminescence can be smaller than the influence of the energy due to reflections.

14. A fiber optical measuring system according to claim 13, including a means for dividing the optical energy reflected into the fiber into a component which is substantially derived from said reflected optical energy and a component which is substantially derived from said photo-luminescent energy.

15. A fiber optical measuring system according to claim 14, including an electronic filter through which the signal transformed from reflected optical energy into electrical energy passes.

16. A fiber optical measuring system according to claim 14, including a control circuit to which an electrical signal derived from the photo-luminescent component is fed for control of exciting optical energy fed into said optical fiber.

17. A fiber optical measuring system according to claim 14, including an electronic circuit for generating a quotient between the signal components derived from reflected and photo-luminescent energy, respectively, after transformation into electrical signals.

* * * * *